(12) United States Patent
An et al.

(10) Patent No.: US 11,577,786 B2
(45) Date of Patent: Feb. 14, 2023

(54) LIGHTWEIGHT COWL CROSSBAR

(71) Applicants: HYUNDAI MOTOR COMPANY, Seoul (KR); KIA MOTORS CORPORATION, Seoul (KR); LG HAUSYS, LTD., Seoul (KR); HYUNDAI MOBIS CO., LTD., Seoul (KR)

(72) Inventors: Jae Hyun An, Seosan-si (KR); In Soo Han, Uiwang-si (KR); Hee Seok Kim, Yongin-si (KR); Il Sang Kim, Hwaseong-si (KR); Ik Jin Jung, Hwaseong-si (KR); Kyeong Hoon Jang, Seoul (KR); Young Jin You, Yongin-si (KR); Sang Hyeon Park, Seoul (KR); Wook Hee Lee, Seoul (KR); Yong Woo Jung, Seoul (KR); Ik Keun Choi, Yongin-si (KR); Young Chan Cho, Yongin-si (KR); Jin Nyeon Kim, Seoul (KR); Byoung Wook Kim, Gunpo-si (KR)

(73) Assignees: Hyundai Motor Company, Seoul (KR); Kia Motors Corporation, Seoul (KR); LG Hausys, Ltd., Seoul (KR); Huyndai Mobis Co., Ltd., Seoul (KR)

( * ) Notice: Subject to any disclaimer, the term of this patent is extended or adjusted under 35 U.S.C. 154(b) by 231 days.

(21) Appl. No.: 17/135,447

(22) Filed: Dec. 28, 2020

(65) Prior Publication Data
US 2021/0371013 A1 Dec. 2, 2021

(30) Foreign Application Priority Data
Jun. 1, 2020 (KR) ........................ 10-2020-0065895

(51) Int. Cl.
B62D 25/08 (2006.01)
B62D 29/04 (2006.01)

(52) U.S. Cl.
CPC ........... B62D 25/081 (2013.01); B62D 29/04 (2013.01)

(58) Field of Classification Search
CPC .............................. B62D 25/081; B62D 29/04
(Continued)

(56) References Cited

U.S. PATENT DOCUMENTS 8,622,464 B2 * 1/2014 Atsumi ................ B62D 25/145
296/72
9,580,107 B1 * 2/2017 Ranga .................. B62D 25/145
(Continued)

FOREIGN PATENT DOCUMENTS

KR 10-2006-0005787 A 1/2006
KR 10-2018-0045649 A 5/2018
(Continued)

*Primary Examiner* — D Glenn Dayoan
*Assistant Examiner* — Sunsurraye Westbrook
(74) *Attorney, Agent, or Firm* — Lempia Summerfield Katz LLC (57) ABSTRACT

A lightweight cowl crossbar includes: a first cowl crossbeam located on a first side frame disposed at a first side of a vehicle body; a second cowl crossbeam fastened to the first cowl crossbeam and fixed to a second side frame disposed at a second side of the vehicle body; a support leg located on the second cowl crossbeam and configured to be supported by the vehicle body, and a drawing block part located on a region where the first cowl crossbeam and the second cowl crossbeam overlap.

15 Claims, 7 Drawing Sheets

(58) Field of Classification Search
USPC .... 296/192, 193.02, 72, 70, 187.03, 187.05, 296/187.12, 193.01; 180/90; 280/752
See application file for complete search history.

(56) References Cited

U.S. PATENT DOCUMENTS

| | | | | |
|---|---|---|---|---|
| 2010/0327627 A1* | 12/2010 | Leanza | ................ | B62D 25/145 |
| | | | | 296/190.01 |
| 2019/0016395 A1* | 1/2019 | Kajikawa | .................. | B62D 1/16 |
| 2020/0189661 A1* | 6/2020 | Kong | .................. | B62D 25/145 |

FOREIGN PATENT DOCUMENTS

| | | |
|---|---|---|
| KR | 10-2018-0083511 A | 7/2018 |
| KR | 10-2020-0072731 A | 6/2020 |

\* cited by examiner

LIGHTWEIGHT COWL CROSSBAR

CROSS-REFERENCE TO RELATED APPLICATION

This application claims priority to and the benefit of Korean Patent Application No. 10-2020-0065895, filed on Jun. 1, 2020, the entire contents of which are incorporated herein by reference.

FIELD

The present disclosure relates to a lightweight cowl crossbar assembly, and more particularly, provides a cowl crossbar made of a plastic material.

BACKGROUND

The statements in this section merely provide background information related to the present disclosure and may not constitute prior art Generally, a vehicle body of a vehicle is composed of side frames disposed at both sides, and several crossbeams connecting the side frames laterally.

Among them, the cowl crossbeam is a structure, which is installed horizontally at the vehicle interior of the rear of a cowl panel, to give rigidity to the front of the vehicle body. The cowl crossbeam supports a steering column, and is designed in a rigid structure that can sufficiently absorb engine vibration transferred from the steering column.

A pair of support legs supporting the cowl crossbeam are coupled to the lower side of the center of the cowl crossbeam. The support leg serves to disperse the vibration from a steering device to the lower portion of the vehicle body. A connection bar for increasing the lateral rigidity of the support leg is installed on the support leg.

Side fastening parts for being coupled to the side frames are installed at both sides of the cowl crossbeam.

In addition, various brackets for installing an instrument panel, an air conditioning duct, a sound device, a fuse box, an air bag, and the like are installed on the cowl crossbeam.

The support leg, the side fastening parts, and various brackets coupled to the cowl crossbeam are each produced by press, extrusion, casting, and the like, and then are welded to be coupled to the cowl crossbeam.

However, we have found that it is desirable that a structure of the cowl crossbar is changed according to the shape of a front slim cockpit of the vehicle based on the supply of an autonomous traveling vehicle. In addition, in the case of a conventional internal combustion engine vehicle, we have discovered that the weight is increased due to the configuration of the aluminum cowl crossbar, thereby worsening fuel efficiency of the vehicle.

The above information disclosed in this Background section is only for enhancement of understanding of the background of the disclosure and accordingly it may contain information that does not form the prior art that is already known to a person of ordinary skill in the art.

SUMMARY

The present disclosure provides a cowl crossbar made of a lightweight plastic and capable of providing stable rigidity.

In addition, the present disclosure provides an integrally molded cowl crossbar with plastic properties.

The objects of the present disclosure are not limited to the objects mentioned above, and other objects of the present disclosure which are not mentioned may be understood by the following description, and may be more clearly understood by the exemplary forms of the present disclosure. In addition, the objects of the present disclosure may be realized by means of the claims and combinations thereof.

An exemplary form of the present disclosure includes a lightweight cowl crossbar including: a first cowl crossbeam located on a first side frame disposed at one side of a vehicle body; a second cowl crossbeam which is fastened so that at least a portion thereof overlaps the first cowl crossbeam and is fixed a second side frame disposed at the other side of the vehicle body; a support leg located on the second cowl crossbeam and configured to be supported by the vehicle body; and a drawing block part located on a region where the first cowl crossbeam and the second cowl crossbeam overlap.

In addition, an exemplary form of the present disclosure includes the lightweight cowl crossbar further including: side fastening parts located on the first cowl crossbeam and the second cowl crossbeam and configured to fasten the first and second cowl crossbeams to the first and second side frames.

In addition, an exemplary form of the present disclosure includes the first cowl crossbeam composed of an inner pipe located therein; a winding layer which is formed along the outer surface of the inner pipe; and an outer pipe which is located on the upper surface of the winding layer.

In addition, an exemplary form of the present disclosure includes the lightweight cowl crossbar in which the winding layer is made of a single oriented fiber composite material.

In addition, an exemplary form of the present disclosure includes the lightweight cowl crossbar in which the winding layer is made of at least two single oriented fibers having angles different from each other.

In addition, an exemplary form of the present disclosure includes the lightweight cowl crossbar in which the second cowl crossbeam includes: a gear structure at one end adjacent to the first cowl crossbeam, and the gear structure is configured to be inserted into a hollow shaft of the first cowl crossbeam to be fixed to the inner surface of the first cowl crossbeam.

In addition, an exemplary form of the present disclosure includes the lightweight cowl crossbar in which the gear structure is located on the support leg.

In addition, an exemplary form of the present disclosure includes the lightweight cowl crossbar including: a hollow part at the front of the support leg fastened to the second cowl crossbeam.

In addition, an exemplary form of the present disclosure includes the lightweight cowl crossbar further including: a steering column fastening part which is bolt-fastened to the first cowl crossbeam.

In addition, an exemplary form of the present disclosure includes the lightweight cowl crossbar including: a steel bracket which is located on at least a portion of the steering column fastening part.

In addition, an exemplary form of the present disclosure includes the lightweight cowl crossbar in which at least portions of the outer surfaces of the first cowl crossbeam and the second cowl crossbeam include flat regions.

In addition, an exemplary form of the present disclosure includes the lightweight cowl crossbar further including: an absorbing member for absorbing shock at one side of the drawing block part.

In addition, an exemplary form of the present disclosure includes the lightweight cowl crossbar in which the support leg includes: an upper end which is fastened to the second cowl crossbeam; and a lower end which is fixed through a fastening groove located in the upper end.

In addition, an exemplary form of the present disclosure includes the lightweight cowl crossbar in which the fastening groove is composed of an upper end fastening groove and a lower end fastening groove, and is configured so that the lower end fastening groove is first broken by the shock, and then the upper end fastening groove is broken.

The present disclosure may obtain the following effects by the aforementioned exemplary forms and the configuration, combination, and use relationship to be described below.

The present disclosure provides the cowl crossbar made of the plastic material, thereby providing the lightweight cowl crossbar.

In addition, the present disclosure includes various coupling relationships and pipes to increase the rigidity of the cowl crossbar made of the plastic material, thereby providing the sufficient rigidity performance.

It is understood that the term "automotive" or "vehicular" or other similar term as used herein is inclusive of motor automotive in general such as passenger automobiles including sports utility automotive (operation SUV), buses, trucks, various commercial automotive, watercraft including a variety of boats and ships, aircraft, and the like, and includes hybrid automotive, electric automotive, plug-in hybrid electric automotive, hydrogen-powered automotive and other alternative fuel automotive (e.g., fuels derived from resources other than petroleum). As referred to herein, a hybrid automotive is an automotive that has two or more sources of power, for example both gasoline-powered and electric-powered automotives.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in more detail with reference to the accompanying drawings. The exemplary forms of the present disclosure may be modified in various forms, and the scope of the present disclosure should not be interpreted as being limited to the following exemplary forms. The present exemplary form is provided to more fully describe the present disclosure to those skilled in the art.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, positions, and shapes will be determined in section by the particular intended application and use environment.

In addition, terms such as " . . . part", " . . . beam", and " . . . " described in the specification mean a unit which processes at least one function or operation, which may be implemented in hardware or a combination of hardware.

In addition, classifying the names of the components as 'first', 'second', and the like in the present specification is made with respect to the front of the vehicle because the names of the components are the same, and the following description is not necessarily limited to the order thereof.

A cowl crossbar 100 according to the present disclosure is made of a combination of polypropylene and glass fiber (GF), and includes at least two molds, and the cowl crossbar 100 is integrally formed through plastic injection molding.

In one form, a first cowl crossbeam 110a according to the present disclosure may be made of polypropylene (PP), and may be configured to include additives which include properties for complementing moisture resistance, heat resistance, and shock resistance based on polyimide as an inner pipe 111.

A winding layer 112 surrounding the outside of the inner pipe 111 is configured to form at least two or more layers of a single oriented fiber composite material made of polypropylene (PP), and configured to be surrounded through an outer pipe 113.

Figure 1A:
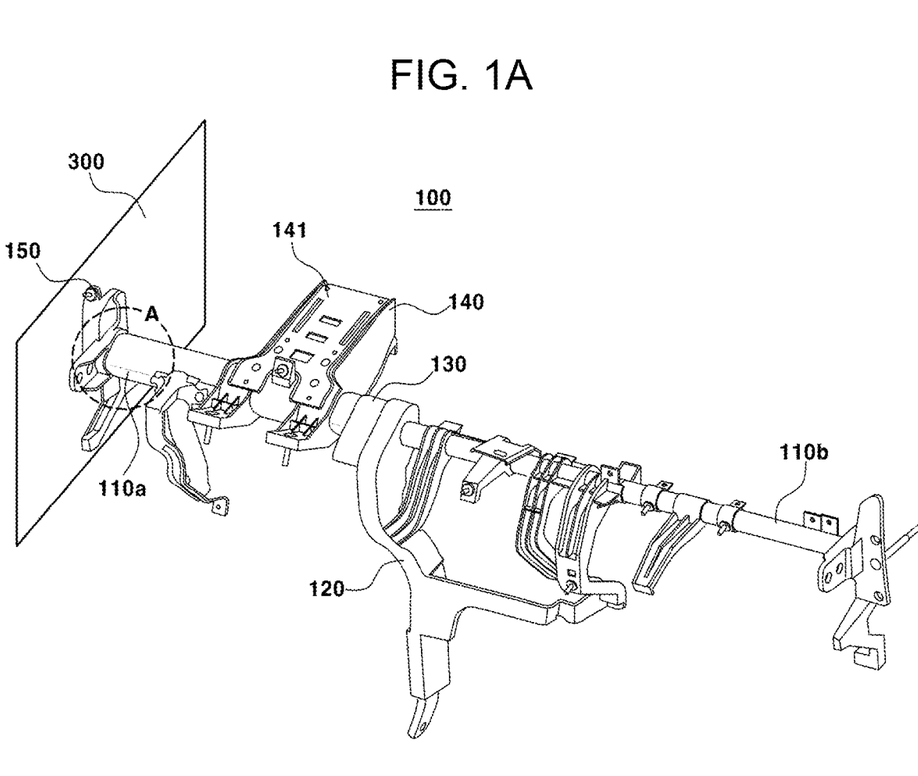
FIG. 1A is a diagram illustration illustrating a configuration of a lightweight cowl crossbar, as an exemplary form of the present disclosure.

In FIG. 1A, the cowl crossbar 100 crosses both sides of a vehicle body, and includes cowl crossbeams 110a, 110b having both ends connected to the side frames 300, and includes side fastening parts 150 configured to be coupled to the cowl crossbeams 110a, 110b and the side frames 300.

The centers of the cowl crossbeams 110a, 110b include a support leg 120 configured to be supported by the vehicle body. In one form, the support leg 120 is located on a second cowl crossbeam 110b, and the support leg 120 is configured to be fastened to a first cowl crossbeam 110a integrally with the second cowl crossbeam 110b. The support leg 120 may have a different shape depending on the shape of a cockpit of the vehicle. In an exemplary form of the present disclosure, as the cowl crossbar 100 applied to a vehicle using a slim cockpit, the support leg 120 located at the center of the cowl crossbeam includes a constant curvature and is configured to be fixed to the vehicle body of the vehicle. The shape of the support leg 120 including the curvature may be applied to a vehicle including a cockpit applied to the vehicle or walk through shapes of a driver seat and a passenger seat.

The cowl crossbar 100 according to the present disclosure is configured by being integrally injected with a plastic material, and is produced by being divided into the first cowl crossbeam 110*a* and the second cowl crossbeam 110*b* and the second cow crossbeam 110*b* may be fastened and fixed to overlap at least a portion of the first cowl crossbeam 110*a*.

The first cowl crossbeam 110*a* is composed of the inner pipe 111, the winding layer 112, and the outer pipe 113, and a single oriented fiber composite material is configured to form at least one layer on the upper portion of the inner pipe 111. At least a partial surface of the outer pipe 113 is formed in a flat state, and configured so that the side fastening part 150 fastened to the first cowl crossbeam 110*a* made of a polypropylene (PP) material, and a steering column fastening part 140 may be bolt-fastened and fixed.

The first cowl crossbeam 110*a* includes the side fastening part 150 to be fastened to the side frame 300 of the vehicle body. The side fastening part 150 is configured to be fastened to one end of the first cowl crossbeam 110*a*, and may be configured to be fastened and fixed to an insert cap 200 formed at the one end inside the hollow when the first cowl crossbeam 110*a* is injected.

Figure 1B:
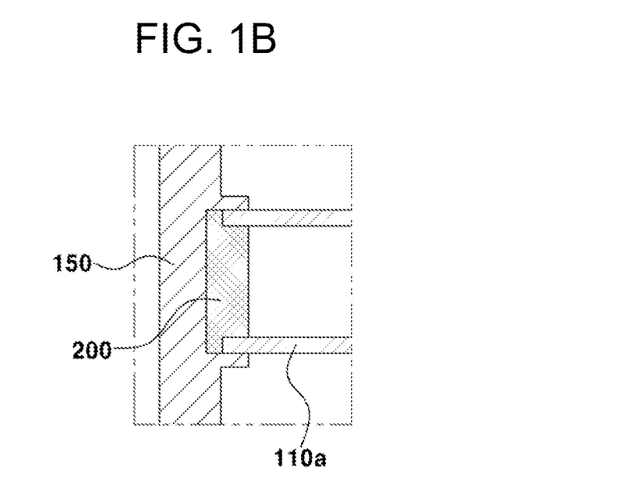
FIG. 1B is an enlarged cross-sectional diagram illustrating a side fastening part, as an exemplary form of the present disclosure.

FIG. 1B illustrates a cross-sectional diagram of a region A illustrated in FIG. 1A, and the insert cap 200 is configured to be fastened to the side fastening part 150. In one form, the insert cap 200 may be configured to be located at the ends of the first cowl crossbeam 110*a* or/and the second cowl crossbeam 110*b* to be configured to be fixed to each side fastening part 150.

The cowl crossbar 100 includes the steering column fastening part 140 fastened to the flat surface of the first cowl crossbeam 110*a*. The steering column fastening part 140 is configured to be fixed to the flat surface located on the upper surface of the first cowl crossbeam 110*a*, and the outermost portion of the steering column fastening part 140 is composed of a steel bracket 141.

The second cowl crossbeam 110*b* is configured to have the outer diameter smaller than the outer diameter of the inner pipe 111 of the first cowl crossbeam 110*a*, and configured so that at least a portion of the second cowl crossbeam 110*b* may be inserted into and fixed to the first cowl crossbeam 110*a* with respect to the drawing block part 130.

In another form, at least a portion of the support leg 120 located at one end of the second cowl crossbeam 110*b* is configured to be inserted into and fixed to the first cowl crossbeam 110*a* together with the second cowl crossbeam 110*b*.

One end of the second cowl crossbeam 110*b* inserted into the first cowl crossbeam 110*a* is formed with a gear structure 114, and may be inserted into the first cowl crossbeam 110*a*, and in another form, at least a portion of the support leg 120 is formed of the gear structure 114 of the second cowl crossbeam 110*b* and may be configured to be inserted into the first cowl crossbeam 110*a*.

One surface of the support leg 120 includes a hollow part 121, and is configured so that the hollow part 121 may absorb shock if a passenger is in contact with the hollow part 121 due to the shock caused in the vehicle.

Moreover, the drawing block part 130 located adjacent to the support leg 120 includes an absorbing member 131 capable of absorbing the shock, and the absorbing member 131 is made of expanded polypropylene (EPP) and is configured to absorb the shock applied to the cowl crossbar 100.

The support leg 120 is configured to include an upper end 122 fastened to the second cowl crossbeam 110*b* and a lower end 123 fastened to the lower surface of the vehicle body. The lower end 123 is fixed through at least one fastening groove 124, 125 located in the upper end 122.

In an exemplary form of the present disclosure, the fastening groove is composed of an upper end fastening groove 124 and a lower end fastening groove 125, and the support rigidity of the lower end fastening groove 125 is lower than the support rigidity of the upper end fastening groove 124 in preparation for the vertical shock. Accordingly, the lower end fastening groove 125 is first broken and then the upper end fastening groove 124 is broken. Thus the fastening between the upper end 122 and the lower end 123 is configured to be released in preparation for the vertical shock applied to the cowl crossbar 100 and the support leg 120. Accordingly, the support leg 120 is configured to absorb the shock applied in the vertical direction of the cowl crossbar 100.

Figure 2:
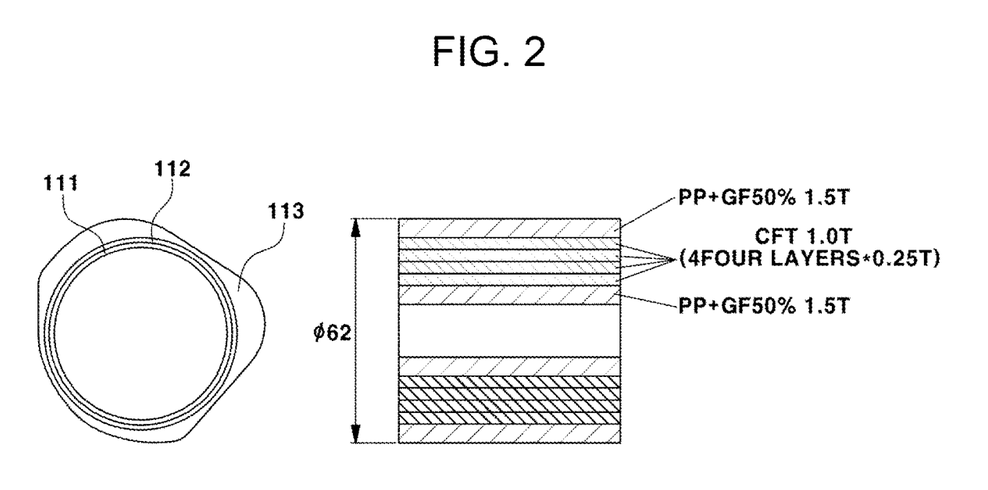
FIG. 2 is a cross-sectional diagram illustrating a first cowl crossbeam, as an exemplary form of the present disclosure.
Figure 3:
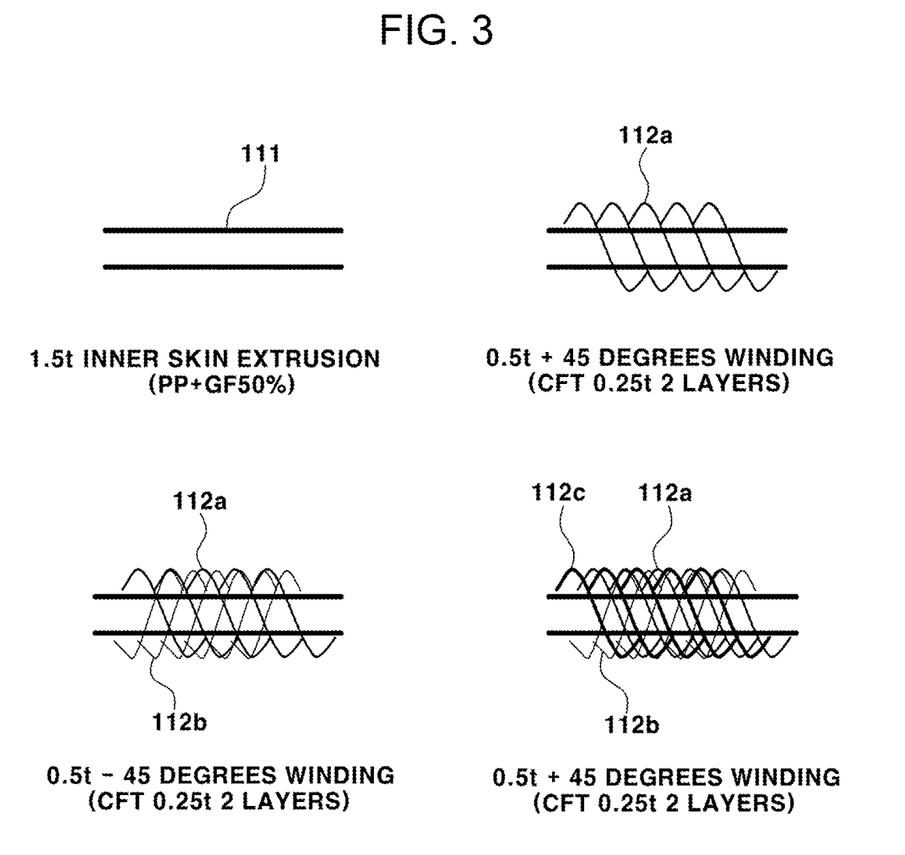
FIG. 3 is a diagram illustrating a method for forming a winding layer of the first cowl crossbeam, as an exemplary form of the present disclosure.

FIG. 2 is a cross-sectional diagram of the first cowl crossbeam 110*a*, as an exemplary form of the present disclosure, and FIG. 3 illustrates a method for manufacturing three composite materials forming the winding layer 112.

The first cowl crossbeam 110*a* is formed in a hollow shape by sequentially stacking the inner pipe 111, the winding layer 112, and the outer pipe 113. That is, the inner pipe 111 is configured to have a hollow circular cross-section, and includes the winding layer 112 made of at least one single oriented fiber composite material wound around the outside of the inner pipe 111. In one form of the present disclosure, the single oriented fiber composite material may be made of a continuous fiber thermoplastic (CFT).

In an exemplary form of the present disclosure, the winding layer 112 is made of three composite materials, and a first composite material 112*a* is first wound to have a slope of 45 degrees with respect to the inner pipe 111. The first composite material 112*a* may be made of two layers of single oriented fibers. Thereafter, a second composite material 112*b* is configured to be located to form an angle of 90 degrees with the first composite material first wound, and the second composite material 112*b* is made of two layers of single oriented fibers. A third composite material 112*c* is wound around the upper surface of the second composite material 112*b* so as to have the same angle as the first composite material 112*a*. The composite materials may be each configured to have a thickness of 0.25 T. Another exemplary form of the present disclosure may configure the winding layer 112 including six composite material layers.

After each composite material is wound, a heating flattening operation of the wound winding layer 112 is performed, and in one form, the heating flattening operation may performed after at least two composite materials are wound.

The outer pipe 113 is configured to be extruded after the winding layer 112 is formed, and the outer pipe 113 may be made of a composite material of polypropylene and glass fiber. In another form, the inner pipe 111 and the outer pipe 113 are made of the same material and may be extruded.

As illustrated in FIG. 2, at least a portion of the outer pipe 113 may be configured to include a flat surface, and in other form, the cross-sectional area of the outer pipe 113 may be located to include a region protruding to have vertices with different thicknesses. Accordingly, the support leg 120, the steering column fastening part 140, the side fastening part 150, and the like may be configured to be bolt-fastened to the flat surface of the first cowl crossbeam 110*a* located between different vertices.

Figure 4:
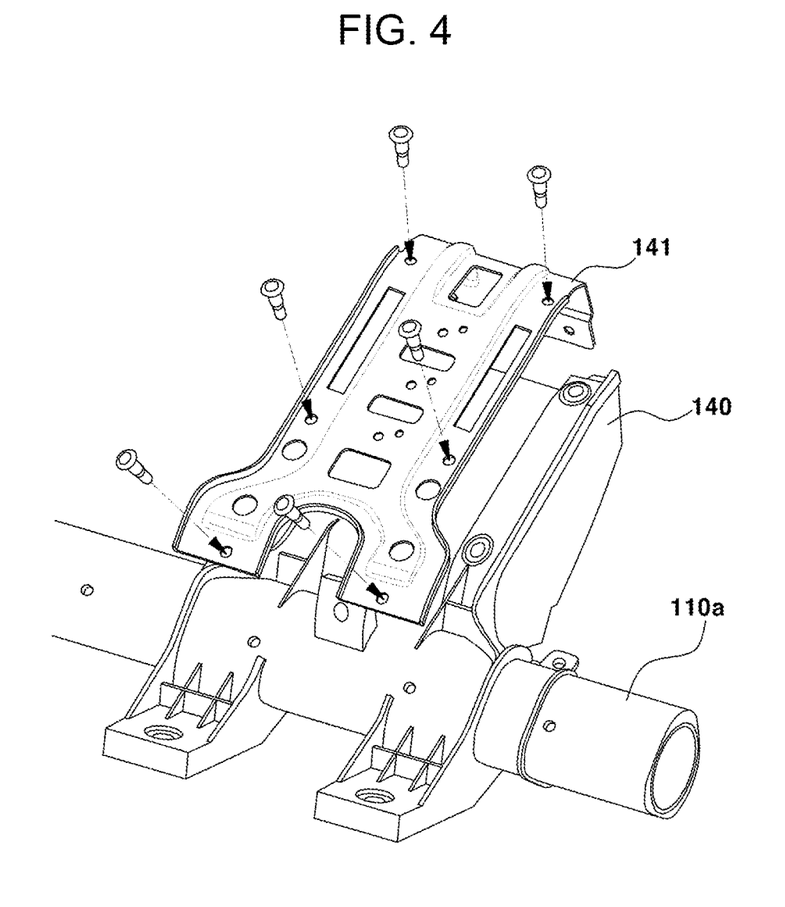
FIG. 4 is a diagram illustrating a configuration of a steering column fastening part, as an exemplary form of the present disclosure.

FIG. 4 is a diagram illustrating a configuration of a steering column fastening part 140 configured by being fastened to the outer pipe 113, as an exemplary form of the present disclosure.

The cowl crossbar 100 may include the steering column fastener 140 located on the first cowl crossbeam 110*a* made of polypropylene and glass fiber through the insert injection. Moreover, the steering column fastening part 140 may be bolt-fastened and fixed to the flat surface of the outer pipe 113 to be fixed to the first cowl crossbeam 110*a* through the insert injection.

Moreover, the steel bracket 141 may be fixed to the upper surface of the steering column fastening part 140, and is configured to perform a function of the wiring ground on the steering column fastening part 140 and to perform a function of absorbing the shock and inhibiting breakage if the shock is applied.

In addition, an exemplary form of the present disclosure may include the steel bracket 141 on the outer pipe 113 as a reinforcing member of the support leg 120, the steering column fastening part 140, the side fastening part 150, and the like which may be configured by the insert injection, which is configured to perform the function of absorbing the shock and inhibiting breakage.

Figure 5:
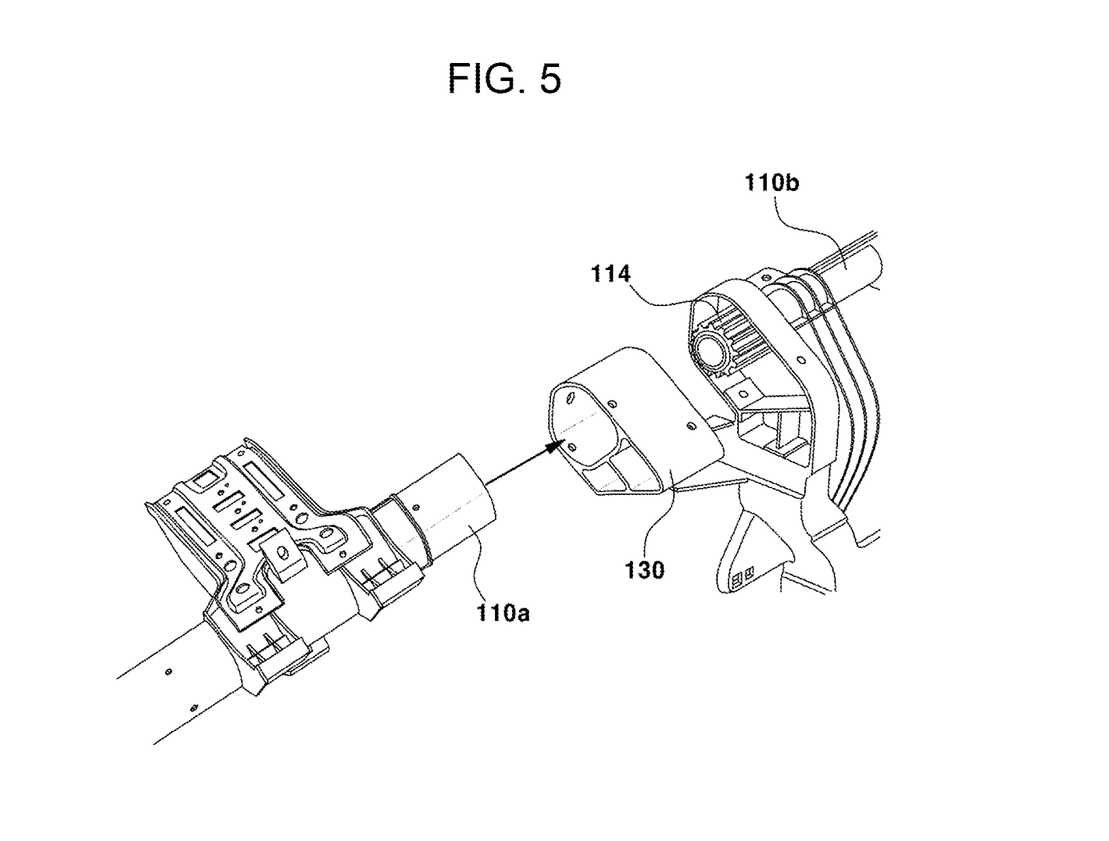
FIG. 5 is a diagram illustrating the first cowl crossbeam and a second cowl crossbeam, as an exemplary form of the present disclosure.

FIG. 5 illustrates a coupling relationship in which the first cowl crossbeam 110*a* and the second cowl crossbeam 110*b* are fastened.

One end of the second cowl crossbeam 110*b* is inserted into and fixed to the inner pipe 111 of the first cowl crossbeam 110*a* according to the present disclosure, and thus the first cowl crossbeam 110*a* includes the gear structure 114 of the second cowl crossbeam 110*b*, a fixed shape corresponding to the gear structure 114 is formed along the inner wall surface of the first cowl crossbeam 110*a*.

In another form, the second cowl crossbeam 110*b* is located to have the same shaft as the hollow shaft of the first cowl crossbeam 110*a*, and the cowl crossbar 100 includes the drawing block part 130 which is configured to surround the first cowl crossbeam 110*a* and the outside of the first cowl crossbeam 110*a* overlapping the second cowl crossbeam 110*b*.

The drawing block part 130 is made of aluminum, and is configured to surround at least a portion of the support leg 120, and both the first cowl crossbeam 110*a* and the second cowl crossbeam 110*b*. Moreover, the drawing block part 130 is configured to include a hollow shape substantially corresponding to the hollow part 121 located at the front of the support leg 120 and is configured to absorb compressive load.

In addition, one side of the drawing block part 130 may further include an absorbing member 131 for absorbing the shock, and serves to absorb the shock applied to the cowl crossbar 100 together with the hollow part 121. Such a configuration is illustrated in the side cross-sectional diagram of FIG. 6.

Figure 6:
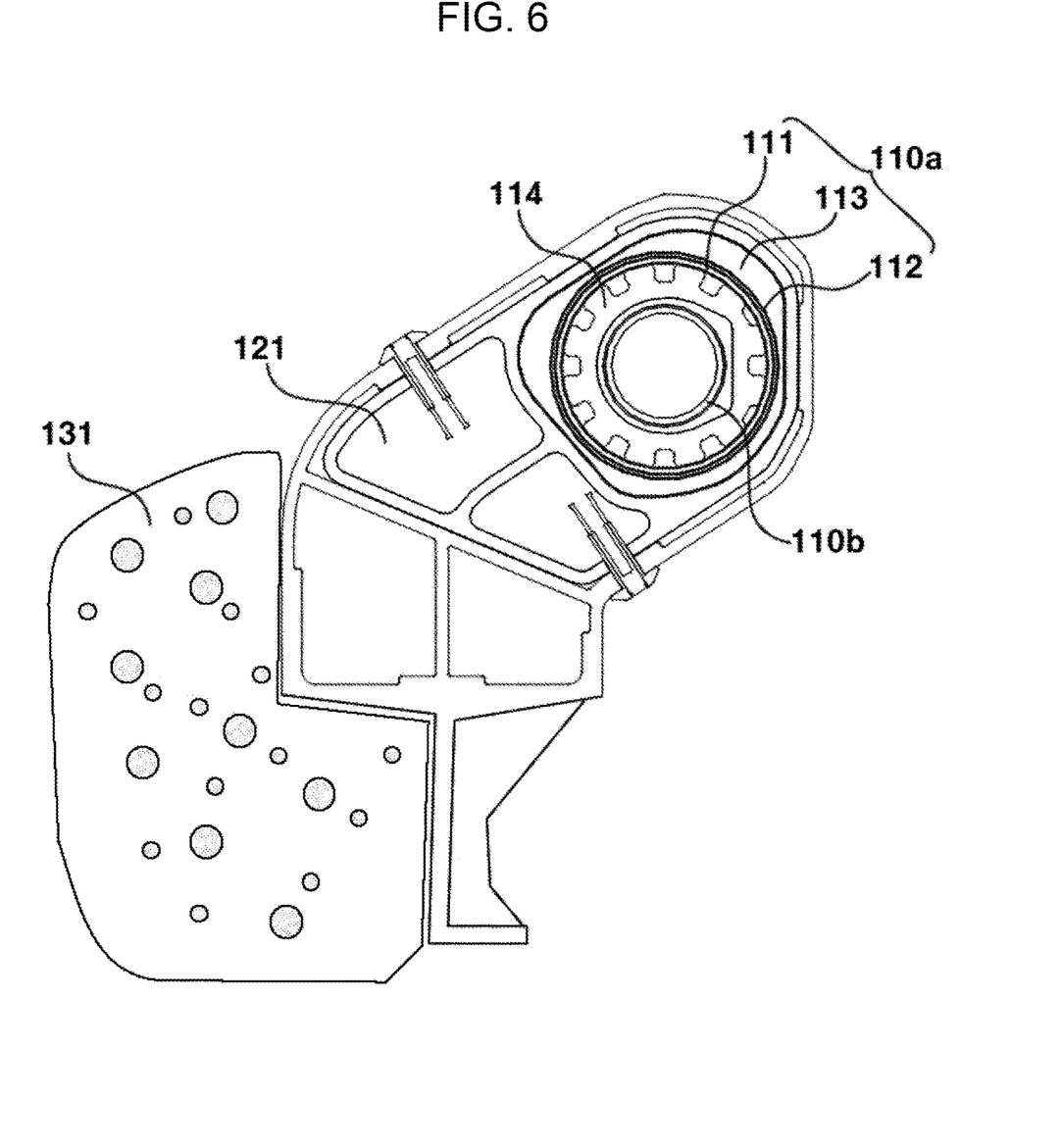
FIG. 6 is a side cross-sectional diagram illustrating a drawing block part, as an exemplary form of the present disclosure.

In FIG. 6, the first cowl crossbeam 110*a* and the second cowl crossbeam 110*b* are configured so that at least portions are located to overlap. In one form, the gear structure 114 of the second cowl crossbeam 110*b* is configured on a portion of the support leg 120, and the portion of the support leg 120 is configured to be inserted into and fixed to the first cowl crossbeam 110*a* integrally with the second cowl crossbeam 110*b*.

The drawing block part 130 configured to surround the outer pipe 113 of the first cowl crossbeam 110*a* is included in the region where the first cowl crossbeam 110*a* and the second cowl crossbeam 110*b* overlap. The drawing block part 130 is configured to surround the first cowl crossbeam 110*a* and the second cowl crossbeam 110*b* and configured to simultaneously surround at least a portion of the support leg 120 located on the second cowl crossbeam 110*b*.

One side of the support leg 120 may include the hollow part 121, and include a hollow shape located in the drawing block part 130 corresponding to the hollow part 121, and one side of the drawing block part 130 includes the absorbing member 131 configured to cushion the shock.

The absorbing member 131 may be located at one end of the drawing block part 130 facing the inside of the vehicle, and performs the function of absorbing the shock applied from the vehicle interior through the absorbing member 131 together with the hollow part 121 and the hollow shape corresponding to the hollow part 121 for absorbing the shock.

In another form, the cowl crossbar 100 may provide the drawing block part 130 configured to surround at least a portion of the upper end of the support leg 120, and the lower end of the support leg 120 facing the drawing block part 130 may include an injection breakage part, and thus the shock first applied is absorbed through the hollow part 121, and the injection breakage part of the support leg 120 is configured to be broken if a predetermined amount of shock or more is applied to the cowl crossbar 100.

As described above, the present disclosure includes a plurality of shock absorbing structures and configurations so that the shock applied to the location where the first cowl crossbeam 110*a* and the second cowl crossbeam 110*b* face each other may be absorbed.

Figure 7:
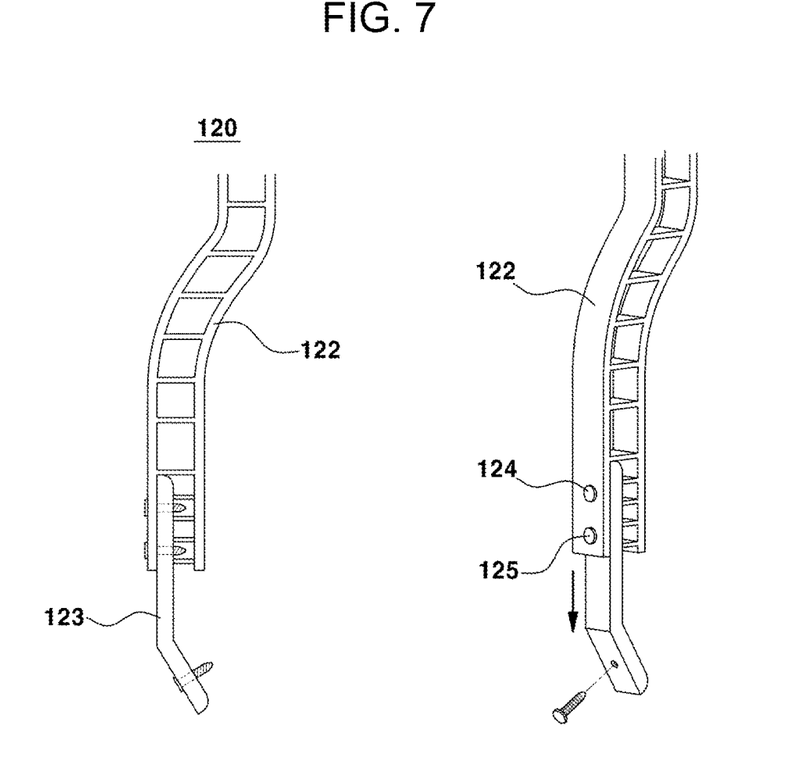
FIG. 7 is a diagram illustrating a configuration of a support leg, as an exemplary form of the present disclosure.

FIG. 7 illustrates a fastening structure of the support leg 120, as an exemplary form of the present disclosure.

The support leg 120 is fastened to the second cowl crossbeam 110*b* and is configured so that the other end is fixed to the vehicle body through a floor of the vehicle. In addition, the support leg 120 according to the present disclosure is configured to be fixed by being composed of the upper end 122 and the lower end 123, and the upper end 122 is configured by the insert injection, and the lower end 123 is configured so that at least a portion of the upper end 122 is inserted to be fixed through the fastening groove. In one form, a bolt hole is located at the lower end 123 at a location corresponding to the fastening groove, and the lower end 123 may be configured to have a variable length in a height direction with respect to the upper end 122.

An exemplary form of the present disclosure provides the support leg 120 configured to include the upper end fastening groove 124 and the lower end fastening groove 125 located in the upper end 122, and is configured so that the bolt fixes the lower end 123 to the upper end 122 through the upper end fastening groove 124 and the lower end fastening groove 125 of the upper end 122.

Moreover, the upper end fastening groove 124 and the lower end fastening groove 125 are configured so that the lower end fastening groove 125 is first broken by the vertical shock of the cowl crossbar 100 and then the upper end fastening groove 124 is broken. Accordingly, the support leg 120 is configured to be moved downward by the shock applied to the cowl crossbar 100, thereby inhibiting the dive phenomenon of the steering column fastener 140.

In summary, the support leg 120 according to the present disclosure may be configured so that the length of the lower end 123 is changed with respect to the upper end 122, and configured to have the two fastening grooves 124, 125 with different breakage strengths, thereby inhibiting the support leg 120 from being moved downward by the shock.

The aforementioned description is to illustrate the present disclosure. In addition, the aforementioned contents describe the exemplary forms of the present disclosure, and the present disclosure may be used in various other combinations, changes, and environments. That is, the present disclosure may be changed or modified within the scope of the concept of the disclosure disclosed in the present specification, the scope equivalent to the disclosed contents, and/or the scope of the technology or knowledge in the art. The described exemplary forms describe the best mode for implementing the technical spirit of the present disclosure, and various changes required in specific application fields and uses of the present disclosure are possible. Accordingly, the aforementioned detailed description of the disclosure is not intended to limit the present disclosure to the disclosed exemplary forms. In addition, the appended claims should be interpreted to further include other exemplary forms.

What is claimed is:

1. A lightweight cowl crossbar comprising:
    a first cowl crossbeam located on a first side frame disposed at a first side of a vehicle body;
    a second cowl crossbeam fastened to the first cowl crossbeam and fixed to a second side frame disposed at a second side of the vehicle body, wherein at least a portion of the second cowl crossbeam is configured to overlap at least a portion of the first cowl crossbeam;
    a support leg located on the second cowl crossbeam and configured to be supported by the vehicle body; and
    a drawing block part located on a region where the first cowl crossbeam and the second cowl crossbeam overlap.

2. The lightweight cowl crossbar of claim 1, further comprising:
    side fastening parts located on the first cowl crossbeam and the second cowl crossbeam, and configured to fastened the first and second cowl crossbeams to the first and second side frames.

3. The lightweight cowl crossbar of claim 1, wherein the first cowl crossbeam comprises:
    an inner pipe located in the first cowl crossbeam;
    a winding layer formed along the outer surface of the inner pipe; and
    an outer pipe located on the upper surface of the winding layer.

4. The lightweight cowl crossbar of claim 3, wherein the winding layer is made of a single oriented fiber composite material.

5. The lightweight cowl crossbar of claim 3, wherein the winding layer is made of at least two single oriented fibers having angles different from each other.

6. The lightweight cowl crossbar of claim 1, wherein the second cowl crossbeam comprises: a gear structure formed in one end of the second cowl crossbeam and arranged adjacent to the first cowl crossbeam, and
    wherein the gear structure is configured to be inserted into a hollow shaft of the first cowl crossbeam and to be fixed to the inner surface of the first cowl crossbeam.

7. The lightweight cowl crossbar of claim 6, wherein the gear structure is located on the support leg.

8. The lightweight cowl crossbar of claim 1, wherein:
    a surface of the support leg fastened to the second cowl crossbeam is provided with a hollow part.

9. The lightweight cowl crossbar of claim 1, further comprising:
    a steering column fastening part that is bolt-fastened to the first cowl crossbeam.

10. The lightweight cowl crossbar of claim 9, comprising:
    a steel bracket located on at least a portion of the steering column fastening part.

11. The lightweight cowl crossbar of claim 1, wherein at least a portion of an outer surface of the first cowl crossbeam and at least a portion of an outer surface of the second cowl crossbeam include flat regions.

12. The lightweight cowl crossbar of claim 1, further comprising:
    an absorbing member configured to absorbing shock at one side of the drawing block part.

13. The lightweight cowl crossbar of claim 1, wherein the support leg comprises:
    an upper end fastened to the second cowl crossbeam; and
    a lower end fixed through a fastening groove located in the upper end.

14. The lightweight cowl crossbar of claim 13, wherein the fastening groove comprises:
    an upper end fastening groove; and
    a lower end fastening groove,
    wherein the lower end fastening groove is configured to be broken first when a shock is applied, and the upper end fastening groove is configured to be broken after the lower end fastening groove is broken.

15. The lightweight cowl crossbar of claim 1, further comprising:
    an insert cap configured to be located at an end of the first crossbeam or at an end of the second crossbeam; and
    a side fastening part configured to be fastened and fixed to the insert cap when the first cowl crossbeam is injected.

* * * * *